April 22, 1924.  H. V. LUDWICK  1,491,014
MOTOR VEHICLE
Filed Feb. 13, 1923    3 Sheets-Sheet 1
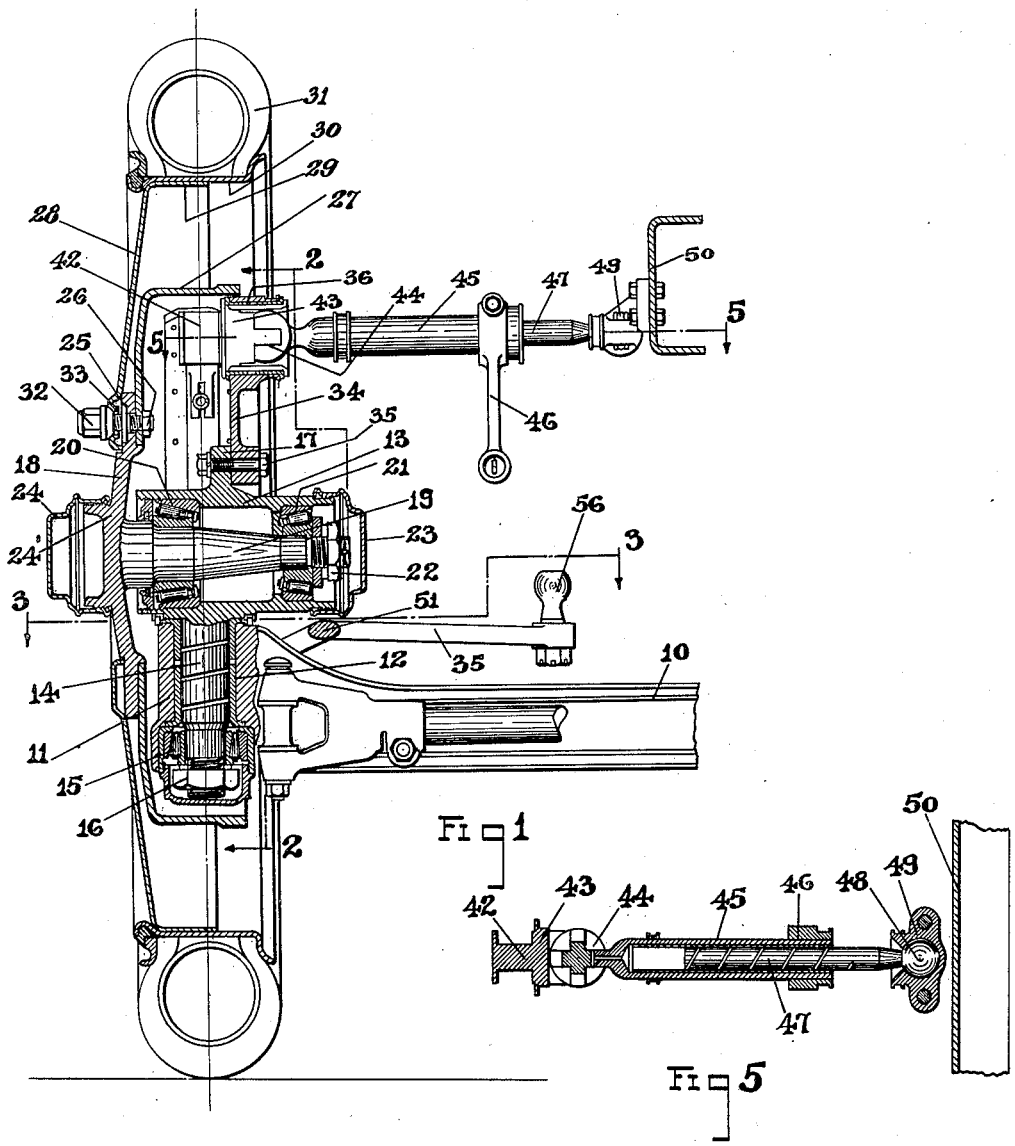
INVENTOR.
HERBERT V. LUDWICK.
BY
ATTORNEY
WITNESS:—
Walter M. Trout.

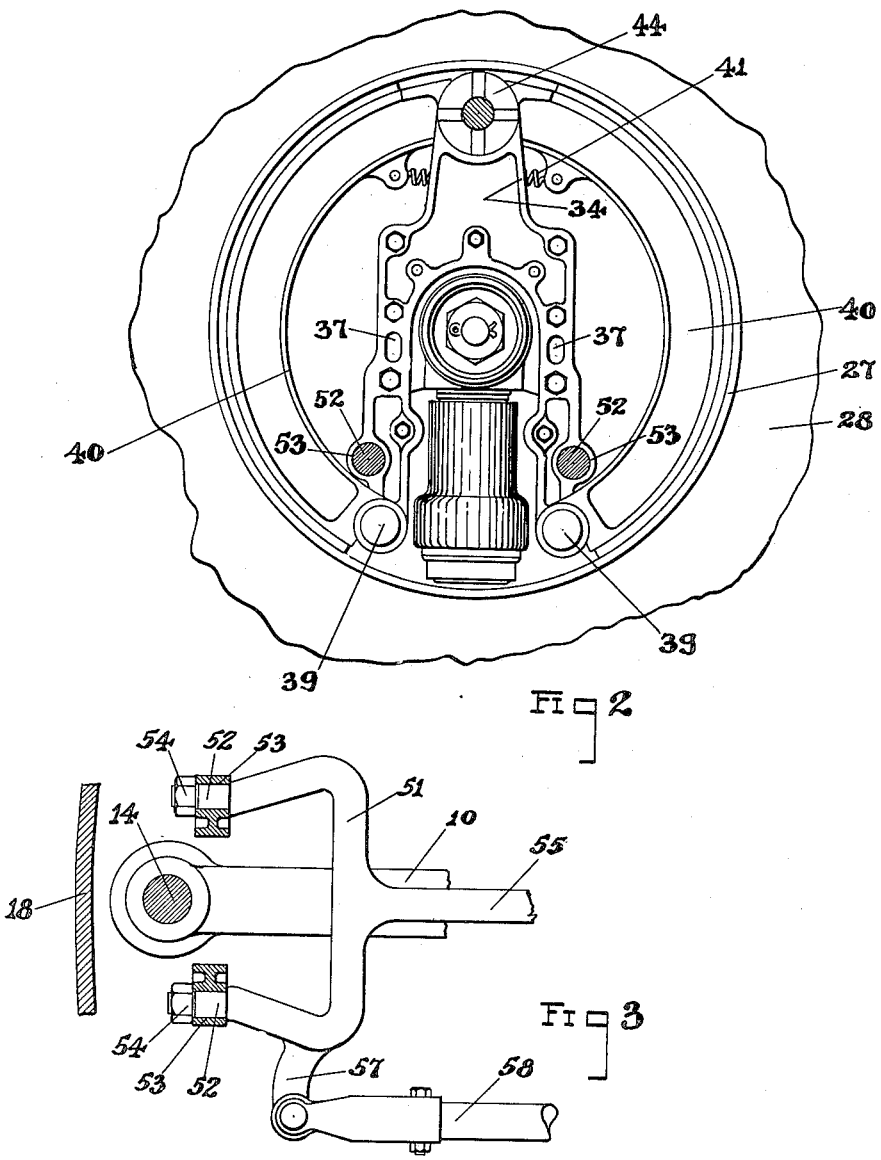

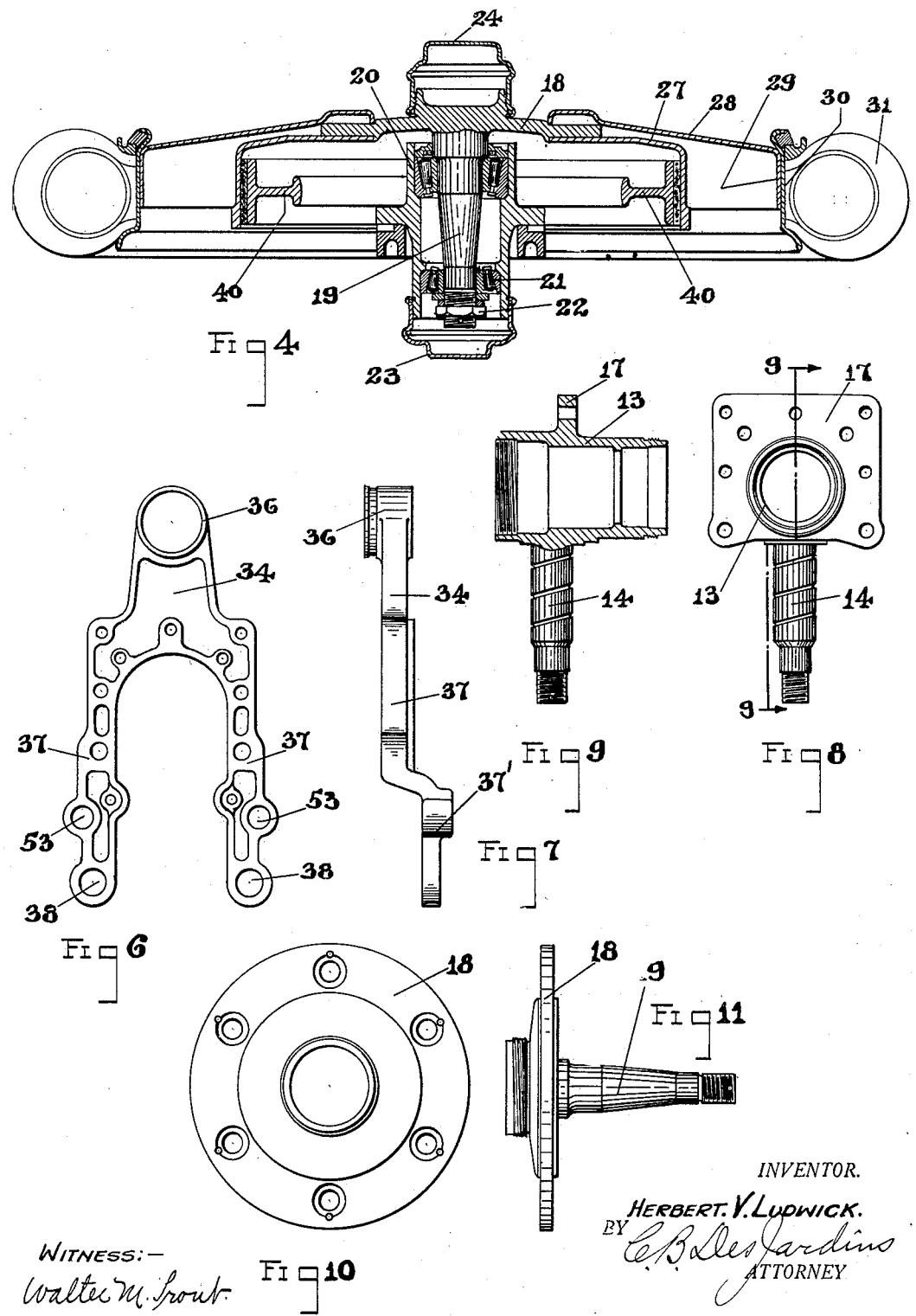

Patented Apr. 22, 1924.

1,491,014

UNITED STATES PATENT OFFICE.

HERBERT V. LUDWICK, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

MOTOR VEHICLE.

Application filed February 13, 1923. Serial No. 618,813.

*To all whom it may concern:*

Be it known that I, HERBERT V. LUDWICK, a citizen of the United States, residing at Philadelphia, Pennsylvania, have invented certain new and useful Improvements in Motor Vehicles, of which I declare the following to be a full, clear, and exact description.

My invention relates to improvements in motor vehicles and has to do, more particularly, with steering and braking mechanism for the front or steering wheels of a motor vehicle.

The principal object of my invention is to provide an improved construction for the front or steering wheels of a motor vehicle, of such a nature that the braking action takes place in a plane in line with the plane of the wheel tread and the wheel swivels around an axis which is substantially in the plane of the wheel tread, so that internal stresses due to braking or steering are minimized and the reaction upon the steering gear due to the application of the brakes is made as small as possible.

A further object of my invention is to provide improved means for actuating a braking mechanism arranged in line with the wheel tread, whereby any effect of the turning movement of the wheel upon the mechanism is eliminated.

A further object of my invention is to provide an improved brake construction for steering wheels which is simple, but strong and durable, and can be easily taken apart if that appears to be necessary.

A further object of my invention is to provide an improved means for connecting the steering arm to steering wheels equipped with brakes.

Another object of my invention is to provide simple and effective means for supporting the brake mechanism in a steering wheel construction so that such brake mechanism may partake of the swiveling movement of the wheel.

Further objects, and objects relating to details and economies of construction and operation, will definitely appear from the detailed description to follow. I accomplish the objects of my invention, in one instance, by the devices and means described in the following specification. My invention is clearly defined and pointed out in the appended claims. A structure constituting a preferred embodiment of my invention is illustrated in the accompanying drawing, in which:

Fig. 1 is a vertical, sectional view through a wheel and brake mechanism embodying my invention, one end of the front axle being shown in full lines.

Fig. 2 is a fragmentary, sectional view, taken substantially on the line 2—2 of Fig. 1.

Fig. 3 is a horizontal sectional view, taken on the line 3—3 of Fig. 1.

Fig. 4 is a horizontal, sectional view through the wheel and brake mechanism.

Fig. 5 is a detail, sectional view, taken on the line 5—5 of Fig. 1 and showing the universal support for the cam actuating sleeve.

Fig. 6 is a plan view of the brake supporting member.

Fig. 7 is a view of said member in side elevation.

Fig. 8 is a view in front elevation of the spindle box.

Fig. 9 is a sectional view through said box taken on the line 9—9 of Fig. 8.

Fig. 10 is a view in front elevation of the wheel hub, and,

Fig. 11 is a view of said hub in side elevation.

In the drawings, the same reference numerals refer to the same parts throughout the several views and the sectional views are taken looking in the direction of the arrows at the ends of the section lines.

My invention consists in providing a demountable wheel and a brake drum, both fastened to a hub which is mounted on one end of the motor vehicle axle so as to rotate freely around a substantially horizontal axis and, also, to swivel about a substantially vertical axis in steering the vehicle, the brake drum and wheel being so connected to the hub that the brakes act on the brake drum in line with the plane of the wheel tread and the vertical axis around which the wheel swivels is also in said plane. In other words, my invention consists in providing a demountable steering wheel, and a brake construction therefor, in which we have both central steering and central braking, in the sense that both the braking action and the swiveling action take place in line with the plane of the wheel tread. In general, I accomplish the objects of my invention by providing a spindle box which is mounted at the end of the axle so as to swivel about a substantially vertical axis. The wheel hub may be provided with a spindle which is journaled in this spindle box so that the hub may rotate freely with reference thereto. The wheel, which may be a disc wheel, is detachably secured to this hub and the brake drum is also secured to said hub, the brake drum being nested within the disc wheel so that the braking surface of the drum is cut by the plane of the wheel tread. The braking mechanism which coacts with the brake drum may be supported by the spindle box. For instance, I find it desirable to secure a brake support to said box, which may have bearings to which the brake shoes are connected and a bearing for the cam which expands the brake shoes into contact with the brake drum. In order to rotate the cam to set the brakes, I find it desirable to provide an actuating sleeve connected to the cam by a joint as close as possible to the bearing in which the cam is journaled. I have found that this actuating sleeve may be supported very effectively by means of a stem or rod having one end connected by a ball joint to the frame of the vehicle and the other end freely moving within the actuating sleeve. I have found that, with this construction, the swiveling movement of the wheel in steering does not have any effect on the expanding cam even though the joint between the cam and the actuating sleeve is not located on the axis about which the wheel turns in steering.

Referring to the numbered parts of the accompanying drawings, in which I have illustrated a construction constituting one embodiment of my invention, the stationary axle, 10, has an enlargement, 11, at the end thereof provided with a substantially vertical bore, 12. A spindle box, 13, is provided with a downwardly extending trunnion, 14, which turns in the bore, 12. The spindle box is secured to the axle by means of a tapered roller bearing, 15, mounted in a bearing seat surrounding the lower end of the bore, 12, and a nut, 16, screwed on the lower threaded end of the trunnion, 14. The spindle box, 13, is provided with a flange, 17, extending laterally therefrom for the purpose which will be described hereinafter. It will be seen that, due to the fact that the trunnion is journaled in the end of the axle, 10, the spindle box is mounted so as to swivel at the end of said axle about a substantially vertical axis. The wheel hub consists of a disc or plate like member, 18, and a spindle, 19, extending horizontally from the central portion of the said member, 18. The spindle, 19, is journaled within the spindle box, 13, by the tapered roller bearings, 20 and 21, and is retained within said box by the nut, 22, screwed upon the threaded end of the spindle, 19. The nut, 22, and the bearing, 21, are covered and concealed by a hub cap, 23, secured on the end of the spindle box, 13. A similar hub cap, 24, is screwed upon the boss, 24', formed on the disc or plate-like member, 18, in line with the spindle, 19. This boss, 24', has no mechanical function and serves merely to give an appearance to the front wheel similar to the rear wheels.

Around the periphery of the disc or plate-like member, 18, there are secured a plurality of threaded studs, 25, which extend parallel to the axis of the hub. The brake drum, 27, is secured to the member, 18, by nuts, 26, threaded on the inner ends of said studs. A disc wheel, 28, is detachably secured to the member, 18, by the nuts, 32, screwed on the outer ends of the studs, 25, and engaging in concave seats, 33, formed in the disc. The wheel disc, 28, has a peripheral flange, 29, to which is secured the rim, 30, carrying the usual tire, 31. The brake drum is nested within the disc wheel, 28, so that a vertical line from the point of contact of the tire with the ground, the plane of the wheel tread, cuts the braking surface of the brake drum, 27. The plane of the wheel tread not only cuts the brake drum, 27, but the wheel and the brake drum are so mounted on the hub that a vertical line through the point of contact of the tire with the ground coincides substantially with the axis about which the wheel swivels in its steering motion, in other words, the plane of the wheel tread includes the axis about which the wheel is swiveled.

The braking mechanism which coacts with the brake drum is carried by a brake support, 34. This brake support, 34, is forked, having the legs, 37, which extend down on opposite sides of the spindle box, 13. This brake support is secured to the flange, 17, of the spindle box by suitable means such as, for instance, the bolts, 35. In the upper portion of the brake support, 34, there is formed a bearing, 36, in which the brake expanding cam is journaled, as we shall presently describe. At the lower ends of the legs, 37, of the brake support, there are provided the holes, 38, in which fit the pins, 39, by means of which the brake shoes, 40, are pivotally connected to the brake support. These brake shoes are of the usual segmental form, conforming to the curvature of the brake drum, and are normally drawn toward each other and away from the brake drum by a spring, 41, connected to the brake shoes near their ends. An expanding cam, 42, is located between the free ends of said brake shoes and is provided with an enlarged portion, 43, which is journaled in the bearing, 36, of the brake support. When the cam is rotated, the free ends of the shoes are forced away from each other, against the tension of the spring, 41, so as to force the shoes into contact with the brake drum and thus apply the brakes. The cam is rotated by means of an actuating sleeve, 45, which is connected to the cam by a universal joint, 44, located as close as possible to the portion, 13, forming the bearing for the cam. An arm, 46, secured to the sleeve, 45, provides a means for rotating the sleeve to actuate the cam. The actuating sleeve, 45, is supported in a manner permitting it considerable freedom of movement such as is required due to the steering motion of the wheels and the movement of the axle and the frame relative to each other, due to inequalities and unevenness of the road and the bouncing of the car, by means of a stem, 47, which is universally supported by the chassis frame, 50, of the motor vehicle and which moves freely within the hollow actuating sleeve, 45. The stem, 47, has a ball, 48, at one end, which is journaled within a bracket, 49, secured to the frame, 50, and having a suitable socket to receive the ball. The opposite end portion of said stem, 47, extends within the hollow actuating sleeve, 45, and may move freely therein.

The wheel is connected to the steering gear of the motor vehicle by means of the yoke, 51, the arms of which have reduced end portions, 52, extending through the holes, 53, in the legs, 37, of the brake support, 34, and secured in place by means of the nuts, 54. An arm, 55, extending from the cross portion of the yoke, 51, is provided with the usual ball, 56, forming a part of the ball joint by which this steering arm is connected through a link with the steering gear of the automobile. This arm, 55, is only provided on the yoke for the wheel at that side of the vehicle on which the steering column is mounted, as will be well understood to those skilled in this art. An arm, 57, extending laterally from the yoke, 51, is pivotally connected with the link, 58, the opposite end of which has a similar connection with the yoke, 51, of the opposite wheel, so that the two wheels are forced to turn together in steering.

From the foregoing description of the parts, the operation of the structure disclosed herein should be readily apparent. The wheel turns freely about a horizontal axis, due to the fact that the horizontal spindle, 19, is journaled within the spindle box, 13. The wheel also swivels about a vertical axis, inasmuch as the spindle box has a vertical trunnion journaled in the end of the axle. The swiveling motion is imparted to the wheel through yoke, 51, and its connection with the steering gear. The brake drum, being carried by the wheel hub, 18, rotates and swivels with the wheel. The brake mechanism, consisting of the brake shoes, 40, and the means for expanding them, being carried by the brake support, 34, does not rotate but partakes of the swiveling movement of the wheel in steering. When the sleeve, 45, is rotated upon the stem, 47, due to its connection by suitable links with the brake lever, the cam, 42, is turned so as to force the free ends of the brake shoes apart, thus forcing the brake shoes against the brake drum and imposing a frictional resistance to the rotation of the drum and wheel hub.

I believe that I am the first to devise an automobile steering wheel construction having both central braking and central steering and I do not wish to be restricted to the particular details of construction disclosed herein for securing such central braking and steering. The construction is such that the wheel may be demounted and removed while the brakes are applied and without disturbing the brake drum or affecting the operation or adjustment of the braking mechanism. I am aware that it is customary in some cases to incline the wheel at a slight angle to the vertical, and I have not used the words "vertical" and "horizontal" in their strict sense, but mean to include constructions in which the wheels are inclined or cambered. The mounting of the wheel and brake drum and the means provided herein for supporting the brake mechanism are particularly effective but, obviously, may be changed in many respects, without departing from my invention. I have found that the means for actuating the expanding cam, which I have illustrated herein, is particularly effective and I have found that it is not affected by the turning movement of the wheels, although the universal joint between the cam on the actuating sleeve is removed a short distance from the axis around which the wheel swivels.

I am aware that the particular embodiment of my invention disclosed herein is susceptible of considerable variation without departing from the spirit thereof and, therefore, I claim my invention broadly as indicated by the appended claims.

Having thus described my invention, what I claim as new and useful and desire to secure by Letters Patent is—

1. In a motor vehicle, the combination of a stationary axle, a wheel hub mounted on said axle so as to rotate freely around a substantially horizontal axis and swivel around a substantially vertical axis, a demountable wheel detachably secured to said hub with the plane of the wheel tread substantially including said vertical axis, a brake drum secured to said hub, and brake mechanism acting on said drum in the plane of the wheel tread.

2. In a motor vehicle, the combination of a stationary axle, a wheel hub having a radial flange and mounted on said axle so as to rotate freely around a substantially horizontal axis and swivel around the end of said axle on a substantially vertical axis, a demountable disc wheel detachably secured to said flange with the plane of the wheel tread including said vertical axis, a brake drum secured to said flange, and a brake mechanism acting on said drum in the plane of the wheel tread.

3. In a motor vehicle, the combination of a stationary axle, a wheel hub mounted on said axle so as to rotate freely around a substantially horizontal axis and swivel around a substantially vertical axis, a demountable wheel detachably secured to said hub with the plane of the wheel tread including said vertical axis, a brake drum secured to said hub, a pair of brake shoes so mounted as to coact with said drum and partaking of the swiveling movement of the wheel, and an expanding cam acting on said brake shoes in the plane of the wheel tread.

4. In a motor vehicle, the combination of a stationary axle, a spindle box journaled in said axle to swivel around a substantially vertical axis, a hub having a spindle journaled in said box so that the hub rotates freely about a substantially horizontal axis, a demountable wheel detachably secured to said hub with the plane of the wheel tread substantially including said vertical axis, a brake drum secured to said hub, and braking mechanism carried by said spindle box and acting on said drum in the plane of the wheel tread.

5. In a motor vehicle, the combination of a stationary axle, a freely rotatable wheel mounted on the end of said axle so as to swivel about a substantially vertical axis, a brake drum fixed to said wheel, braking mechanism coacting with said drum and including an expanding cam, an actuating sleeve connected to said cam by a universal joint, and a stem having a universal connection with the vehicle frame, said actuating sleeve being freely movable on said stem.

6. In a motor vehicle, the combination of a stationary axle, a freely rotatable wheel mounted on said axle so as to swivel about a substantially vertical axis, a brake drum rotating with said wheel, and braking mechanism coacting with said drum and including an expanding cam, an actuating sleeve connected to said cam by a universal joint, a bearing between said cam and joint in which said cam is journaled, and a stem having a ball-joint connection with the vehicle frame and freely movable within said actuating sleeve.

7. In a motor vehicle, the combination of a stationary axle, a freely rotatable wheel mounted on said axle so as to swivel about a substantially vertical axis, a brake drum rotating with said wheel, and braking mechanism coacting with said drum and including a pair of pivoted brake shoes, an expanding cam located between the free ends of said brake shoes, an actuating sleeve connected to said cam by a universal joint, a bearing for said cam between the brake shoes and said joint, and a support for said sleeve consisting of a stem having a ball-joint connection with the vehicle frame at one end and having its other end freely movable within said actuating sleeve.

8. In a motor vehicle, the combination of a stationary axle, a spindle box carried by said axle so as to swivel around a substantially vertical axis, a hub carried by said spindle box so as to rotate around a substantially horizontal axis, a wheel secured to said hub, a brake drum secured to said hub, a brake support secured to said spindle box and straddling the same, braking mechanism coacting with said drum and carried by said brake support, and brake actuating mechanism carried by said support.

9. In a motor vehicle, the combination of a stationary axle, a spindle box carried by said axle and mounted to swivel around a substantially vertical axis, a hub carried by said spindle box and rotatable about a substantially horizontal axis, a wheel secured to said hub, a brake drum secured to said hub, a brake support secured to said spindle box and straddling the same, a pair of brake shoes pivoted to the lower portion of said support and coacting with said drum, and an expanding cam carried by said support and located between the free ends of said brake shoes.

10. In a motor vehicle, the combination of a stationary axle, a spindle box mounted on said axle to swivel around a substantially vertical axis, a hub having a horizontal spindle journaled in said spindle box, a wheel secured to said hub, a brake drum secured to said hub, a brake support secured to said spindle box and straddling the same, a pair of brake shoes pivoted to the lower end of said support and coacting with said drum, and an expanding cam carried by the upper portion of said support and located between the free ends of said brake shoes.

11. In a motor vehicle, the combination of a stationary axle, a spindle box having a downwardly extending trunnion journaled in the end of said axle, a hub having a horizontal spindle journaled in said box, a wheel secured to said hub, a brake drum secured to said hub, a brake support secured to said spindle box and straddling the same, a pair of brake shoes pivoted to the lower end of said support and coacting with said drum, and an expanding cam carried by the upper portion of said support and engaging the free ends of said brake shoes.

12. In a motor vehicle, the combination of a stationary axle, a spindle box having a depending vertical trunnion journaled in the end of the axle, a hub having a radial flange and a horizontal spindle journaled in said box, a disc wheel detachably secured to said flange, a brake drum secured to said flange, a brake support secured to said spindle box and extending above and below the same, a pair of brake shoes pivotally connected to the lower end of said support, an expanding cam journaled in the upper portion of said support and positioned between the free ends of said brake shoes, and means for rotating said cam.

13. In a motor vehicle, the combination of a stationary axle, a spindle box having a laterally-extending flange and a vertical trunnion journaled in the end of said axle, a hub having a radial flange and a horizontal spindle journaled in said spindle box, a disc wheel detachably secured to said flange, a brake drum secured to said flange, a brake support secured to the flange of said spindle box and straddling the latter, a pair of brake shoes pivotally connected to the lower ends of said support and coacting with the drum, and an expanding cam journaled in the upper portion of said support and positioned between the free ends of said brake shoes, means for rotating said cam, and a steering arm connected to said brake support.

14. In a motor vehicle, the combination of a stationary axle, a spindle box journaled in said axle to swivel about a substantially vertical axis, a hub carried by said box so as to rotate about a substantially horizontal axis, a wheel secured to said hub, a brake drum secured to said hub, a forked brake support straddling said spindle box and having downwardly extending legs and an upwardly extending central portion, a pair of brake shoes pivotally connected to the lower ends of said legs, an expanding cam journaled in the upper portion of said support, means for rotating said cam, and a forked steering arm connected to the steering gear of the motor vehicle and straddling the end of the axle, the forks of said steering arm being rigidly connected to the legs of said brake support.

In testimony whereof, I affix my signature.

HERBERT V. LUDWICK.